US012752514B2

(12) United States Patent
Awano

(10) Patent No.: US 12,752,514 B2
(45) Date of Patent: Oct. 6, 2026

(54) METAL COMPOSITE STRUCTURE AND METHOD FOR PRODUCING SAME

(71) Applicant: HONDA MOTOR CO., LTD., Tokyo (JP)

(72) Inventor: Katsuyuki Awano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 48 days.

(21) Appl. No.: 18/805,924

(22) Filed: Aug. 15, 2024

(65) Prior Publication Data

US 2025/0065604 A1 Feb. 27, 2025

(30) Foreign Application Priority Data

Aug. 22, 2023 (JP) ................................ 2023-134563

(51) Int. Cl.

| | |
|---|---|
| ***B32B 15/14*** | (2006.01) |
| ***B32B 7/12*** | (2006.01) |
| ***B32B 15/01*** | (2006.01) |
| ***B32B 15/08*** | (2006.01) |

(52) U.S. Cl.

CPC .............. *B32B 15/012* (2013.01); *B32B 7/12* (2013.01); *B32B 15/08* (2013.01); *B32B 15/14* (2013.01); *B32B 2250/02* (2013.01); *B32B 2262/101* (2013.01); *B32B 2262/106* (2013.01); *B32B 2307/50* (2013.01); *B32B 2307/732* (2013.01); *B32B 2311/24* (2013.01); *B32B 2311/30* (2013.01); *B32B 2605/08* (2013.01)

(58) Field of Classification Search

CPC ................................ B32B 7/12; B32B 15/18

See application file for complete search history.

(56) References Cited

U.S. PATENT DOCUMENTS

| | | | |
|---|---|---|---|
| 2020/0316915 | A1 | 10/2020 | Ibaragi et al. |
| 2023/0120541 | A1 | 4/2023 | Usui et al. |

FOREIGN PATENT DOCUMENTS

| | | | |
|---|---|---|---|
| JP | 2010-143461 A | 7/2010 | |
| JP | 2010-143477 A | 7/2010 | |
| JP | 2019-119212 A | 7/2019 | |
| WO | 2021/199380 A1 | 10/2021 | |

(Continued)

OTHER PUBLICATIONS

English Translation of WO2021199380A1 from USPTO Fit database (Year: 2026).*

(Continued)

*Primary Examiner* — Adam Krupicka

(74) *Attorney, Agent, or Firm* — Rankin, Hill & Clark LLP

(57) ABSTRACT

A metal composite structure includes: a thin steel sheet; a low-specific-gravity sheet material having a lower specific gravity than the thin steel sheet and a lower strength than the thin steel sheet; and an adhesive layer which bonds the thin steel sheet and the low-specific-gravity sheet material and has a lower strength than the thin steel sheet and the low-specific-gravity sheet material, wherein a sheet thickness of the thin steel sheet and a sheet thickness of the low-specific-gravity sheet material are set so that a neutral axis of the metal composite structure is located in the adhesive layer for a bending rigidity set in advance for the metal composite structure, based on an equation representing the bending rigidity.

8 Claims, 5 Drawing Sheets

(56) References Cited

FOREIGN PATENT DOCUMENTS

WO 2023/079805 A1 5/2023

OTHER PUBLICATIONS

Japanese Office Action received in corresponding Japanese application No. 2023-134563 dated Jan. 7, 2025 with English translation (10 pages).

Kiyomi Mori, et al., “Bending Properties of Adhesively Bonded Laminates with Thin Metal Sheets”, Proceedings of Scientific Sessions, The society of Materials Science , Japan, 1997, pp. 115-116.

* cited by examiner

METAL COMPOSITE STRUCTURE AND METHOD FOR PRODUCING SAME

CROSS REFERENCE TO RELATED APPLICATIONS

This application claims foreign priority to Japanese Patent Application No. 2023-134563, filed Aug. 22, 2023, the disclosure of which is incorporated herein by reference in its entirety.

TECHNICAL FIELD OF THE INVENTION

The present invention relates to a metal composite structure and a method for producing the same.

BACKGROUND ART

Efforts have been made in recent years to provide access to sustainable transportation systems friendly to vulnerable traffic participants, such as elderly people and children. To achieve the aim, the efforts are focusing on research and development to further improve the safety and convenience of traffic through development aimed at improving the reinforcing effect of a vehicle.

There is known a side sill structure including: a sheet member partitioning a closed section of a side sill so that the resulting two spaces are side by side in the vehicle width direction; and a pair of reinforcing members disposed in the closed section of the side sill so as to sandwich the sheet member from both sides thereof in the vehicle width direction (for example, see Japanese Patent Application Publication No. 2010-143461). Each of the pair of reinforcing members of the side sill structure has a substantially hat shape in a cross-sectional view and includes a bulged portion bonded to the sheet member and a flange portion bonded to the inner wall face of the side sill. With such a side sill structure, the sheet member and the reinforcing members ensure the rigidity of the side sill to secure a large crush stroke of the side sill in a side collision. With this, the side sill efficiently absorbs energy in a side collision.

SUMMARY

However, in the case of the conventional side sill structure described in Japanese Patent Application Publication No. 2010-143461, an adhesive layer is interposed between each of the reinforcing members and the sheet member. Due to this, the side sill structure may cause a separation starting from the adhesive layer in a side collision before the reinforcing members and/or the sheet member is broken, resulting in an insufficient reinforcing effect. In view of this, a metal composite structure which is applied to a vehicle body structure such as the side sill structure and is expected to contribute to collision load transmission even while including an adhesive layer is desired to exhibit a more excellent reinforcing effect.

It is an object of the invention to provide a metal composite structure which, while containing an adhesive layer, is excellent in the reinforcing effect without being broken starting from an adhesive and to provide a method for producing the same. This contributes to a reduction in the weight of the vehicle body, which is required for collision safety.

To achieve the above-described object, an aspect of the present invention is a metal composite structure including: a thin steel sheet; a low-specific-gravity sheet material having a lower specific gravity than the thin steel sheet and a lower strength than the thin steel sheet; and an adhesive layer bonding the thin steel sheet and the low-specific-gravity sheet material and having a lower strength than the thin steel sheet and the low-specific-gravity sheet material, wherein a sheet thickness of the thin steel sheet and a sheet thickness of the low-specific-gravity sheet material are set so as to satisfy the following Equation (1) representing a bending rigidity D of the metal composite structure and Inequality (2), the bending rigidity D being set in advance:

$$D = \frac{bE_1}{3(1-\nu_1^2)}\left\{(h_1+h_3-h_0)^3-(h_3-h_0)^3\right\}+\frac{bE_2}{3(1-\nu_2^2)}\left\{(h_2+h_0)^3-h_0^3\right\} \quad (1)$$

$$h_1 < h_2 \quad (2)$$

wherein, in Equation (1), b is a width of the metal composite structure, $E_1$ is a longitudinal elastic modulus of the thin steel sheet, $E_2$ is a longitudinal elastic modulus of the low-specific-gravity sheet material, $v_1$ is a Poisson's ratio of the thin steel sheet, $v_2$ is a Poisson's ratio of the low-specific-gravity sheet material, $h_1$ is the sheet thickness of the thin steel sheet, $h_2$ is the sheet thickness of the low-specific-gravity sheet material, $h_3$ is a thickness of the adhesive layer, and $h_0$ is a distance of a neutral axis of the metal composite structure from a joint interface between the adhesive layer and the low-specific-gravity sheet material, the distance measured from the joint interface between the low-specific-gravity sheet material and the adhesive layer towards the thin steel sheet and satisfying $0 \leq h_0 \leq h_3$, and wherein in Inequality (2), $h_1$ and $h_2$ have the same meaning as in Equation (1).

Another aspect of the present invention is a method for producing a metal composite structure, the method including steps of: providing a thin steel sheet and a low-specific-gravity sheet material having a lower specific gravity than the thin steel sheet and having a lower strength than the thin steel sheet; and joining the thin steel sheet and the low-specific-gravity sheet material via an adhesive layer having a lower strength than the thin steel sheet and the low-specific-gravity sheet, wherein the step of joining the thin steel sheet and the low-specific-gravity sheet material is performed such that a neutral axis of the metal composite structure in bending deformation is set within the adhesive layer or at a joint interface between the adhesive layer and the thin steel sheet or at a joint interface between the adhesive layer and the low-specific-gravity sheet material.

According to the present invention, it is possible to provide a metal composite structure which, while including an adhesive layer, is excellent in reinforcing effect without being broken from an adhesive, and contributes to required reduction of the weight of a vehicle body for collision safety, and a method for producing the same.

DETAILED DESCRIPTION OF EMBODIMENT

Next, a mode (embodiment) for embodying the metal composite structure of the present invention will be described in detail with reference to the drawings as appropriate.

As will be described in detail later, the metal composite structure of the present embodiment has an asymmetric sandwich structure composed of a plurality of sheet members. The metal composite structure in the present embodiment is assumed to be a composite structure in which a predetermined sheet-like member is stacked on a thin steel sheet via an adhesive layer. Specifically, in a case of a buckling stress being generated in the metal composite structure by a load inputted in a direction along a joint surface of the metal composite structure, the metal composite structure has a neutral axis within the adhesive layer or at a joint interface between the adhesive layer and the thin steel sheet or at a joint interface between the adhesive layer and the sheet-like member Preferably, the metal composite structure has a neutral axis at a joint interface between the adhesive layer and the thin steel sheet or at a joint interface between the adhesive layer and the sheet-like member.

The neutral axis in the metal composite structure of the present embodiment is set based on a relationship equation described in detail later.

Figure 1:
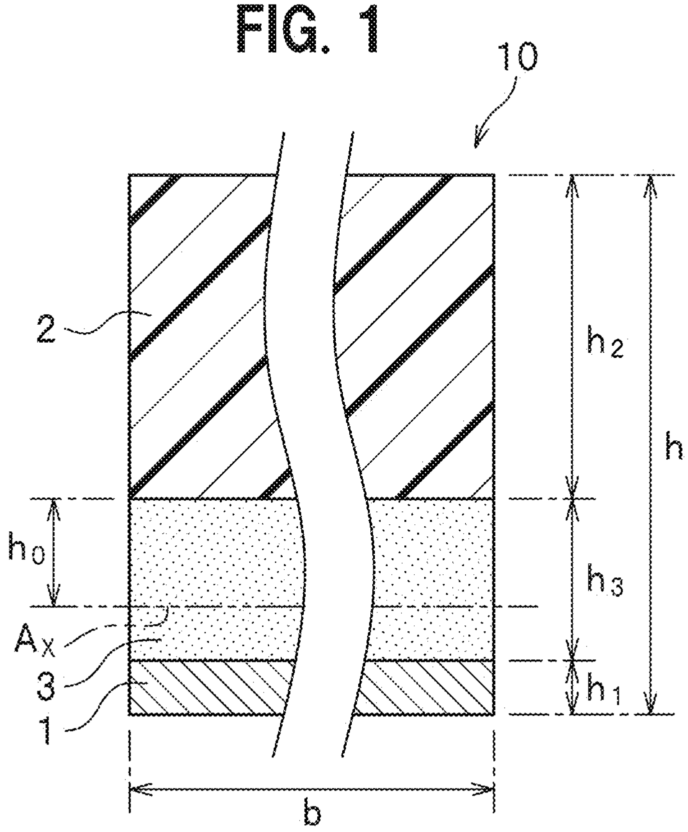
FIG. 1 is an explanatory diagram illustrating the structure of a metal composite structure according to an embodiment of the present invention.

FIG. 1 is an explanatory diagram illustrating the structure of a metal composite structure 10 according to an embodiment of the present invention.

As illustrated in FIG. 1, the metal composite structure 10 of the present embodiment includes a thin steel sheet 1, a low-specific-gravity sheet material 2 having a specific gravity smaller than that of the thin steel sheet 1, and an adhesive layer 3 that bonds the thin steel sheet 1 and the low-specific-gravity sheet material 2.

The thin steel sheet 1 of the present embodiment may be a known thin steel sheet and a commercially available product may be used as the thin steel sheet 1. The thin steel sheet 1 in the present embodiment is assumed to be a high-tensile steel sheet having a sheet thickness of 1.0 mm or more and 2.0 mm or less and a tensile strength of 340 MPa or more, but is not limited thereto.

As illustrated in FIG. 1, the sheet thickness $h_2$ of the low-specific-gravity sheet material 2 is greater than the sheet thickness $h_1$ of the thin steel sheet 1 ($h_1<h_2$).

Specific examples of the low-specific-gravity sheet material 2 include aluminum alloy sheets (including duralumin sheets), magnesium alloy sheets, Carbon Fiber Reinforced Plastic (CFRP) sheets, and Glass Fiber-Reinforced Plastic (GFRP) sheets, but are not limited thereto.

The low-specific-gravity sheet material 2 is appropriately selected in accordance with the required bending strength of the metal composite structure 10, which is determined in advance according to the type of vehicle body structure (for example, a side sill structure, a center pillar structure, or the like) to which the metal composite structure 10 is applied.

The adhesive layer 3 is assumed to be made of a structural adhesive such as an epoxy adhesive or a urethane adhesive, but is not limited thereto.

The adhesive layer 3 may be formed of an injection molding resin (thermoplastic resin) injected between the thin steel sheet 1 and the low-specific-gravity sheet material 2 placed in a predetermined mold.

The longitudinal elastic modulus of the adhesive layer 3 is remarkably lower than that of the thin steel sheet 1.

Moreover, the strength of the adhesive layer 3 is also remarkably lower than that of the thin steel sheet 1.

The strength of the adhesive layer 3 is also remarkably lower than that of the low-specific-gravity sheet material 2.

As illustrated in FIG. 1, the thickness $h_3$ of the adhesive layer 3 is equal to or larger than the sheet thickness $h_1$ of the thin steel sheet 1 ($h_1 \leq h_3$). As illustrated in FIG. 1, the thickness $h_3$ of the adhesive layer 3 preferably may be less than the sheet thickness $h_2$ of the low-specific-gravity sheet material 2 ($h_2>h_3$).

As illustrated in FIG. 1 the thickness h of the metal composite structure 10 of the present embodiment is made up of the sheet thickness $h_1$ of the thin steel sheet 1, the thickness $h_3$ of the adhesive layer 3, and the sheet thickness $h_2$ of the low-specific-gravity sheet material 2 ($h=h_1+h_3+h_2$).

In an exemplary case of the metal composite structure 10 of the present embodiment, as illustrated in FIG. 1, the neutral axis Ax is set within the adhesive layer 3. Alternatively, the neutral axis Ax is set at the joint interface between the adhesive layer 3 and the thin steel sheet 1 or at the joint interface between the adhesive layer 3 and the low-specific-gravity sheet material 2, although not illustrated.

More in detail, in the case of the metal composite structure 10, the sheet thickness $h_1$ of the thin steel sheet 1 and the sheet thickness $h_2$ of the low-specific-gravity sheet material 2 are set so as to satisfy Equation (1), which represents the bending rigidity D of the metal composite structure, and Inequality (2). As a result, the neutral axis Ax is set within the adhesive layer 3 or at the joint interface between the adhesive layer 3 and the thin steel sheet 1 or at the joint interface between the adhesive layer 3 and the low-specific-gravity sheet material 2. Preferably, the neutral axis Ax is set at the joint interface between the adhesive layer 3 and the thin steel sheet 1 or at the joint interface between the adhesive layer 3 and the low-specific-gravity sheet material 2.

$$D = \frac{bE_1}{3(1-v_1^2)}\{(h_1+h_3-h_0)^3-(h_3-h_0)^3\} + \frac{bE_2}{3(1-v_2^2)}\{(h_2+h_0)^3-h_0^3\} \tag{1}$$

$$h_1 < h_2 \tag{2}$$

In Equation (1), b is the width of the metal composite structure 10 (see FIG. 1); $E_1$ is the longitudinal elastic modulus of the thin steel sheet 1 (see FIG. 1); $E_2$ is the longitudinal elastic modulus of the low-specific-gravity sheet material 2 (see FIG. 1); $v_1$ is the Poisson's ratio of the thin steel sheet 1 (see FIG. 1); $v_2$ is the Poisson's ratio of the low-specific-gravity sheet material 2 (see FIG. 1); $h_1$ is the sheet thickness of the thin steel sheet 1 (see FIG. 1); $h_2$ is the sheet thickness of the low-specific-gravity sheet material 2 (see FIG. 1); $h_3$ is the thickness of the adhesive layer 3 (see FIG. 1); and as illustrated in FIG. 1, $h_0$ is the distance from the joint interface between the low-specific-gravity sheet material 2 and the adhesive layer 3 to the neutral axis Ax, wherein the distance is measured from the joint interface between the low-specific-gravity sheet material 2 and the adhesive layer 3 towards the thin steel sheet 1. In Inequality (2), $h_1$ and $h_2$ have the same meaning as in Equation (1).

The neutral axis Ax is set within the adhesive layer 3 or at the joint interface between the adhesive layer 3 and the thin steel sheet 1 or at the joint interface between the adhesive layer 3 and the low-specific-gravity sheet material 2. That is, $h_0$ satisfies $0 \le h_0 \le h_3$.

Next, a description will be given of the principle of the metal composite structure 10 according to the present embodiment.

Figure 2:
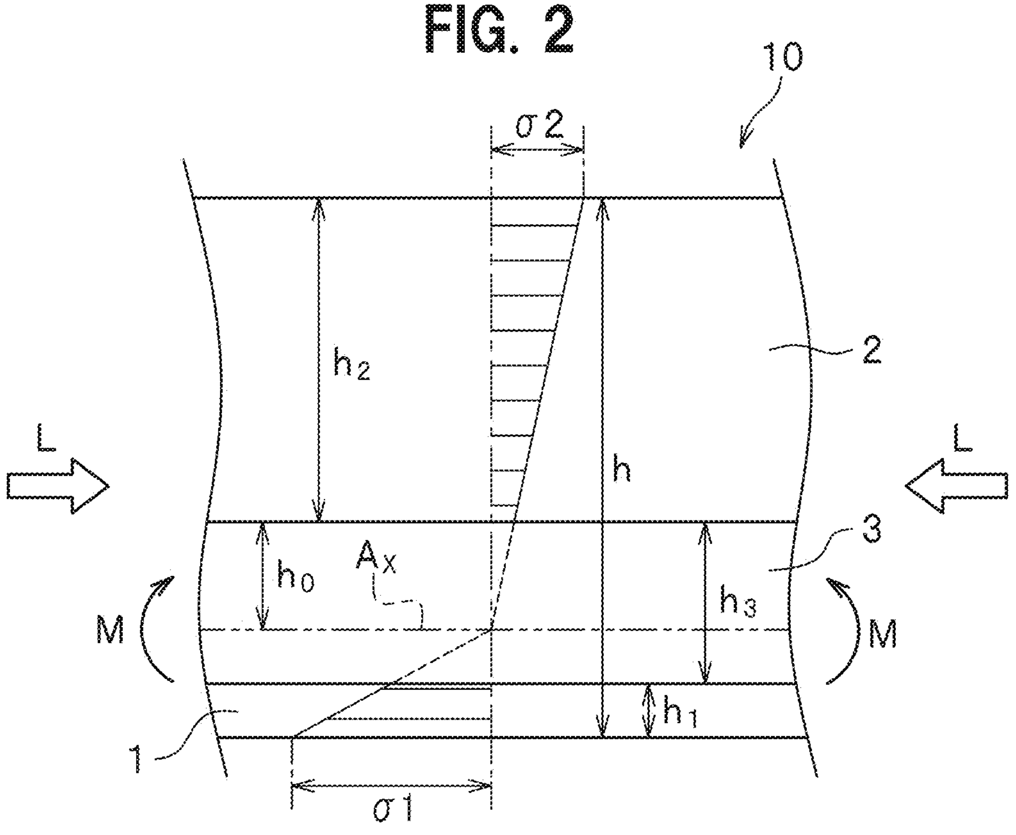
FIG. 2 is a schematic diagram illustrating the relationship between the thicknesses of a thin steel sheet, a low-specific-gravity sheet material, and an adhesive layer in the metal composite structure and the stress distribution.

FIG. 2 is a schematic diagram illustrating the relationship between the stress distribution and the thicknesses of the thin steel sheet 1, the low-specific-gravity sheet material 2, and the adhesive layer 3, i.e., $h_1$, $h_2$, and $h_3$, in the metal composite structure 10.

As illustrated in FIG. 2, the present embodiment assumes a case where a bending moment M is exerted on the metal composite structure 10 so that the metal composite structure 10 is compressed on the side of the low-specific-gravity sheet material 2 by a load L being applied in a direction along the joint surfaces of the metal composite structure 10. That is, the present embodiment assumes a case where buckling stress is generated in the metal composite structure 10. In this case, the vertical stress generated in the thin steel sheet 1 exhibits elastic behavior until the metal composite structure 10 reaches a fracture.

The longitudinal elastic modulus $E_3$ of the adhesive layer 3 is smaller than the longitudinal elastic modulus $E_1$ of the thin steel sheet 1 and the longitudinal elastic modulus $E_2$ of the low-specific-gravity sheet material 2 ($E_3 < E_1$, $E_3 < E_2$). Thus, the sharing of the bending moment in the adhesive layer 3 is neglectable.

The metal composite structure 10 of the present embodiment, which is of an asymmetric sandwich structure in which the thin steel sheet 1 and the low-specific-gravity sheet material 2 have different longitudinal elastic moduli $E_1$ and $E_2$ and different fracture strengths, is set such that the neutral axis Ax does not coincide with the centroid, as illustrated in FIG. 2.

Specifically, as illustrated in FIG. 2, the neutral axis Ax is set at a position corresponding to the partial thickness $h_0$ of the adhesive layer 3 from the joint interface between the low-specific-gravity sheet material 2 and the adhesive layer 3.

That is, $h_0$ is, based on the so-called "beam theory", defined as illustrated in the following Equation (3).

$$h_0 = \frac{E_1 h_1 (h_1 + 2h_3) - E_2 h_2^2}{2(E_1 h_1 - E_2 h_2)} \tag{3}$$

In Equation (3), $E_1$ is the longitudinal elastic modulus of the thin steel sheet 1 (see FIG. 2); $E_2$ is the longitudinal elastic modulus of the low-specific-gravity sheet material 2 (see FIG. 2); $h_1$ is the sheet thickness of the thin steel sheet 1 (see FIG. 2); $h_2$ is the sheet thickness of the low-specific-gravity sheet material 2 (see FIG. 2); and $h_3$ is the thickness of the adhesive layer 3 (see FIG. 2). The thickness $h_3$ of the adhesive layer 3 is equal to or greater than the sheet thickness $h_1$ of the thin steel sheet 1 and smaller than the sheet thickness $h_2$ of the low-specific-gravity sheet material 2 ($h_1 \le h_3$, $h_2 > h_3$).

The maximum bending stress σ1 generated in the thin steel sheet 1 by the bending moment M illustrated in FIG. 2 is defined by the following Equation (α) and the maximum bending stress σ2 generated in the low-specific-gravity sheet material 2 by the bending moment M illustrated in FIG. 2 is defined by the following Equation (β):

$$\sigma 1 = \frac{E_1 (h_3 + h_1 - h_0) M}{D} \tag{$\alpha$}$$

$$\sigma 2 = -\frac{E_2 (h_2 + h_0) M}{D} \tag{$\beta$}$$

where $E_1$, $h_0$, $h_1$ and $h_3$ in Equation (α) and $E_2$, $h_0$ and $h_2$ in Equation (β) have the same meanings as in Equation (3). D in Equation (α) and Equation (β) is the bending rigidity of the metal composite structure 10 (see FIG. 2).

As described above, as the sharing of the bending moment M (see FIG. 2) in the adhesive layer 3 (see FIG. 2) is neglectable, the bending rigidity D of the metal composite structure 10 (see FIG. 2) is represented by the following Equation (γ):

$$D = E_1 I_1 + E_2 I_2 \tag{$\gamma$}$$

In Equation (γ), $E_1$ has the same meaning as in Equation (α); and $E_2$ has the same meaning as in Equation (β).

As $I_1$ is the cross-sectional secondary moment of the thin steel sheet 1 and $I_2$ is the cross-sectional secondary moment of the low-specific-gravity sheet material 2, Equation (γ) becomes Equation (1).

In the metal composite structure 10 (see FIG. 2) of the present embodiment, the sheet thickness $h_1$ of the thin steel sheet 1 (see FIG. 2) and the sheet thickness $h_2$ of the low-specific-gravity sheet material 2 (see FIG. 2) are set to satisfy Equation (1) on condition that Inequality (2) is satisfied, i.e., the sheet thickness $h_2$ of the low-specific-gravity sheet material 2 (see FIG. 2) is larger than the sheet thickness $h_1$ of the thin steel sheet 1 (see FIG. 2) ($h_1 < h_2$), so that the neutral axis Ax (the position corresponding to $h_0$) is set within the adhesive layer 3 ($0 < h_0 < h_3$), or at the joint interface between the adhesive layer 3 and the thin steel sheet 1 ($h_0 = h_3$), or at the joint interface between the adhesive layer 3 and the low-specific-gravity sheet material 2 ($h_0 = 0$). Preferably, the neutral axis Ax (the position of $h_0$; see FIG. 2) is set at the joint interface between the adhesive layer 3 and the thin steel sheet 1 or at the joint interface between the adhesive layer 3 and the low-specific-gravity sheet material 2, though not illustrated.

That is, the metal composite structure 10 (see FIG. 2) of the present embodiment is configured such that the neutral axis Ax (the position corresponding to $h_0$) is set to the adhesive layer 3 (see FIG. 2) having the lowest strength when the bending moment M (see FIG. 2) is applied as described above.

A method for producing such a metal composite structure 10 includes a first step of providing the thin steel sheet 1 (see FIG. 1) and the low-specific-gravity sheet material 2 (see FIG. 1), and a second step of bonding the thin steel sheet 1 and the low-specific-gravity sheet material 2 to each other via the adhesive layer 3 (see FIG. 1).

In this production method, the sheet thickness $h_1$ of the thin steel sheet 1 and the sheet thickness $h_2$ of the low-specific-gravity sheet material 2 of the metal composite structure 10 are set so as to satisfy the above Equation (1) representing the bending rigidity D, which would be set in advance according to the type of the specific structure such as a side sill structure or a center pillar structure. With this, the neutral axis Ax of the metal composite structure 10 is set at a predetermined position. Specifically, the neutral axis Ax is set within the adhesive layer 3 ($0<h_0<h_3$) or at the joint interface between the adhesive layer 3 and the thin steel sheet 1 ($h_0=h_3$) or at the joint interface between the adhesive layer 3 and the low-specific-gravity sheet material 2 ($h_0=0$). Preferably, the neutral axis Ax is set at the joint interface between the adhesive layer 3 and the thin steel sheet 1 or at the joint interface between the adhesive layer 3 and the low-specific-gravity sheet material 2.

Next, a description will be given of a vehicle structure using the metal composite structure 10 (see FIG. 1) according to the present embodiment. Here, a usage mode of the metal composite structure 10 will be specifically described by taking a side sill structure as an example of a vehicle structure.

Figure 3:
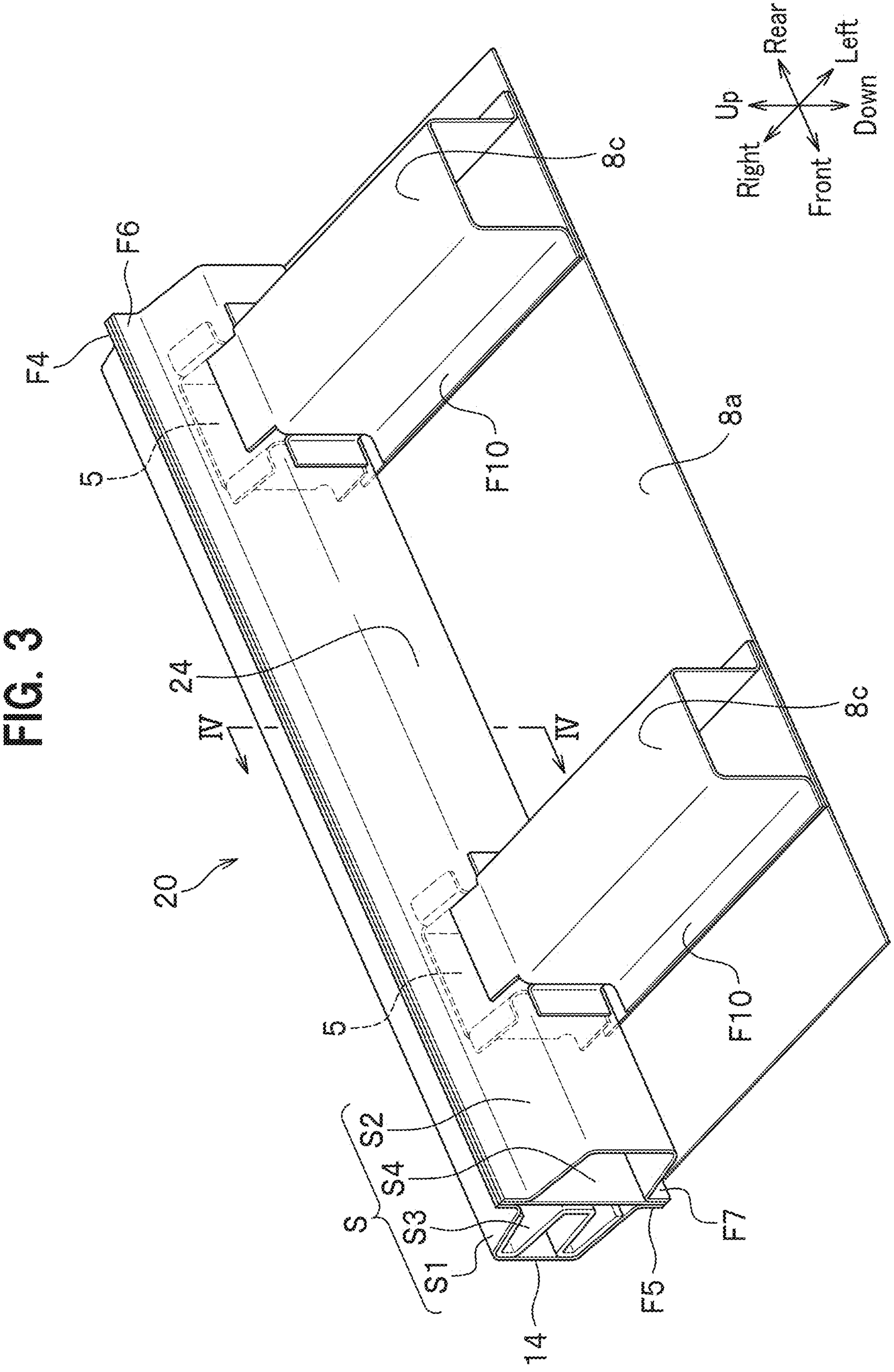
FIG. 3 is a perspective view illustrating a side sill structure to which the metal composite structure according to the embodiment of the present invention is applied, as viewed from the vehicle interior side.

FIG. 3 is a perspective view illustrating a side sill structure 20 as viewed down from the vehicle interior side. Note that in FIG. 3, the up-down, front-rear, and left-right directions indicated by the arrows coincide with the up-down, front-rear, and left-right directions of the vehicle provided with the side sill structure 20. In the following description, the left-right directions of the vehicle may be referred to as a vehicle width direction.

As illustrated in FIG. 3, the side sill S constituting the side sill structure 20 is a vehicle frame member extending in the vehicle front-rear direction on a lateral side of a vehicle lower portion.

A vehicle width direction outer edge of a floor panel 8*a* is joined to a vehicle width direction inner side of the side sill S by spot welding or the like.

Floor cross members 8*c* each extending in the vehicle width direction are disposed on the floor panel 8*a*. Each of the floor cross members 8*c* has a hat shape that opens downward in a cross-sectional view intersecting the extending direction of the floor cross member 8*c*. Each of the floor cross members 8*c* has a flange F10, which corresponds to a brim of the hat shape, joined to the floor panel 8*a* by spot welding or the like.

A vehicle width direction outer end portion of the floor cross member 8*c* is welded to the vehicle width direction inner side of the side sill S.

The side sill S constituting the side sill structure 20 includes a side sill inner part S2, a side sill outer part S1, a sheet member S4, a reinforcing member S3, and bulkheads 5.

The side sill inner part S2 is disposed inward (on the left side illustrated in FIG. 3) of the side sill outer part S1 in the vehicle width direction, and has a hat shape that opens outward in the vehicle width direction in a cross-sectional view intersecting the longitudinal direction (the front-rear direction illustrated in FIG. 3). To be specific, the side sill inner part S2 includes a bulged portion 24, an upper flange F6, and a lower flange F7.

The side sill outer part S1 is disposed on the vehicle width direction outer side (on the right side illustrated in FIG. 3) of the side sill inner part S2. The side sill outer part S1 has a hat shape that opens inward in the vehicle width direction in a cross-sectional view intersecting the longitudinal direction (the front-rear direction illustrated in FIG. 3). To be specific, the side sill outer part S1 includes a bulged portion 14, an upper flange F4, and a lower flange F5.

The sheet member S4 is formed of a long, substantially flat sheet extending along the longitudinal direction of the side sill S (the front-rear direction illustrated in FIG. 3) with its sheet surface facing in the vehicle width direction.

The sheet member S4 is sandwiched between the flanges F6, F7 of the side sill inner part S2 and the flanges F4, F5 of the side sill outer part S1, and is joined by three-layer welding.

In FIG. 3, the bulkheads 5 indicated by the hidden lines (dashed lines) are disposed spaced apart from each other in the longitudinal direction (front-rear direction) of the side sill S so as to correspond to the pair of floor cross members 8*c*, respectively. The bulkheads 5 are disposed in the bulged portion 24 of the side sill inner part S2 so as to be positioned inward in the vehicle width direction with respect to the sheet member S4.

The positions of the bulkheads 5 in the bulged portion 24 coincide with the joint portions between the floor cross members 8*c* and the side sill inner part S2 in the front-rear direction.

The bulkheads 5 of the present embodiment each have a hat shape that opens inward in the vehicle width direction (opens towards left illustrated in FIG. 3) in a transverse cross-sectional view.

The bulkheads 5 are joined to the inner wall of the side sill inner part S2 by spot welding or the like.

The reinforcing member S3 is a resin-made, elongated member made of a fiber reinforced plastic or the like, which has a substantially M-shaped cross section and extends along the extending direction of the side sill S (the front-rear direction illustrated in FIG. 3). The reinforcing member S3 is arranged inside the bulged portion 14 of the side sill outer part S1.

Figure 4:
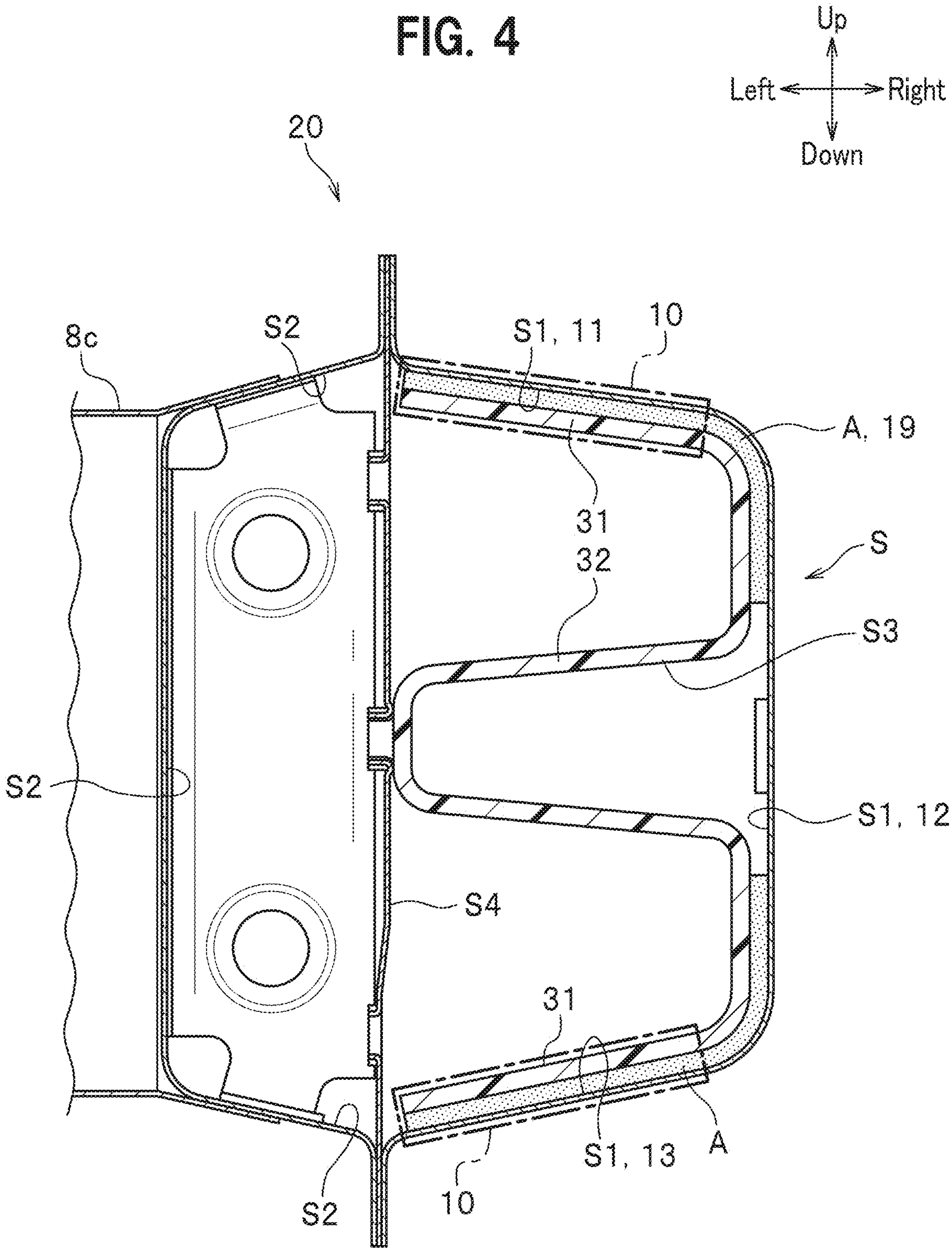
FIG. 4 is a cross-sectional view taken along line IV-IV of FIG. 3.

As illustrated in FIG. 4, which is a cross-sectional view taken along line IV-IV of FIG. 3, the reinforcing member S3 includes a pair of upper and lower outer convex portions 31 and an inner convex portion 32 that is located between the pair of outer convex portions 31 and protrudes toward the sheet member S4. The protruding tip end portion of the inner convex portion 32 is engaged with the sheet member S4 by fitting or the like.

The upper outer convex portion 31 is formed to be in close contact with an upper wall 11 and an outer wall 12 of the side sill outer part S1, on the corner portion defined by the upper wall 11 and the outer wall 12. The upper outer convex portion 31 is joined to the side sill outer part S1 with a structural adhesive A so as to be integrated with the side sill outer part S1 from the upper wall 11 to the outer wall 12.

The lower outer convex portion 31 is formed to be in close contact with a lower wall 13 and the outer wall 12 of the side sill outer part S1, on the corner portion defined by the lower wall 13 and the outer wall 12. The lower outer convex portion 31 is joined to the side sill outer part S1 with a structural adhesive A so as to be integrated with the side sill outer part S1 from the lower wall 13 to the outer wall 12.

As illustrated in FIG. 4, the side sill structure 20 has a pair of upper and lower metal composite structures 10 at portions corresponding to the upper wall 11 and lower wall 13 of the side sill outer part S1.

That is, each of the metal composite structures 10 of the side sill structure 20 includes a thin steel sheet 1 (see FIG. 1) constituting the upper wall 11 or lower wall 13 of the side sill outer part S1, a low-specific-gravity sheet material 2 (see FIG. 1) made of the fiber reinforced plastic of the reinforcing member S3, and an adhesive layer 19 (see FIG. 1) made of the structural adhesive A.

Operation and Effect

Next, a description will be given of the operation and effect of the metal composite structure 10 according to the present embodiment.

In the metal composite structure 10 according to the present embodiment, the sheet thickness $h_1$ of the thin steel sheet 1 and the sheet thickness $h_2$ of the low-specific-gravity sheet material 2 are set so as to satisfy the above-described Equation (1) representing the bending rigidity D of the metal composite structure 10 and the above-described Inequality (2), where the bending rigidity D is set in advance.

With such a metal composite structure 10, the neutral axis Ax is set within the adhesive layer 3 ($0<h_0<h_3$) or at the joint interface between the adhesive layer 3 and the thin steel sheet 1 ($h_0=h_3$) or at the joint interface between the adhesive layer 3 and the low-specific-gravity sheet material 2 ($h_0=0$). Preferably, the neutral axis Ax is set at the joint interface between the adhesive layer 3 and the thin steel sheet 1 or at the joint interface between the adhesive layer 3 and the low-specific-gravity sheet material 2. With this, when a bending moment M is applied to the metal composite structure 10, the neutral axis Ax is set to the adhesive layer 3 having the lowest strength.

In the metal composite structure 10, no stress is applied to the adhesive layer 3 in which the neutral plane (neutral axis Ax) is located and thus the low-specific-gravity sheet material 2 is restrained from being separated from the thin steel sheet 1. The metal composite structure 10 exhibits high bending rigidity in comparison with a conventional metal composite structure having the same weight.

The metal composite structure 10 has an asymmetric sandwich structure by satisfying Equation (1) and Inequality (2). With this, the metal composite structure 10 restrains out-of-plane deformation in combination with the adjustment of the position of the neutral axis Ax as described above. The metal composite structure 10 uses up material physical properties which cannot be used up by only a conventional thin steel sheet, and can improve buckling strength of the thin steel sheet 1.

Figure 5A:
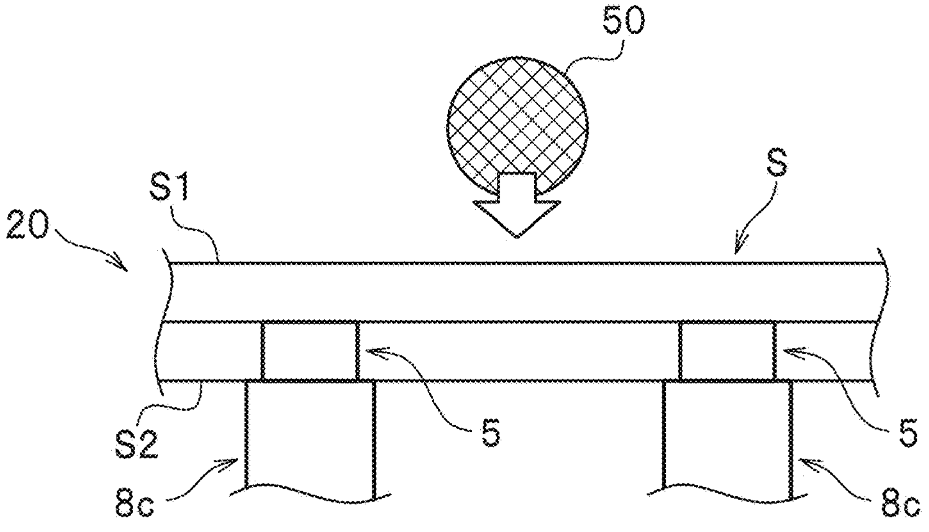
FIGS. 5A, 5B, and 5C are schematic explanatory diagrams illustrating a deformation behavior of the side sill structure at the time of a side collision.
Figure 5B:
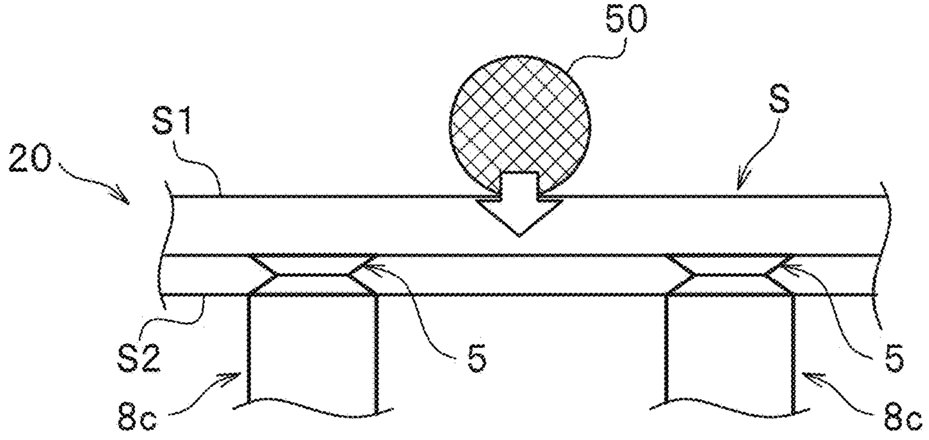
Figure 5C:
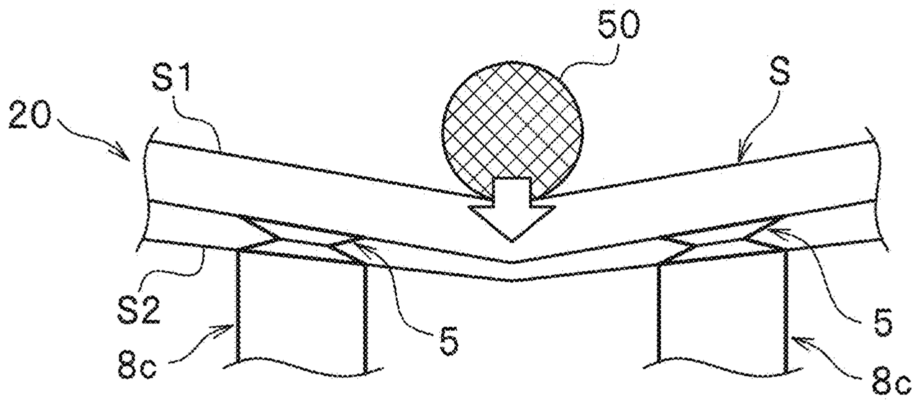

FIGS. 5A to 5C are schematic explanatory diagrams illustrating, in chronological order, a deformation behavior of the side sill structure 20 (see FIG. 4) including the metal composite structure 10 (see FIG. 4) when a side collision occurs. In FIGS. 5A to 5C, reference numeral 50 denotes an object that relatively approaches the side sill S.

As illustrated in FIG. 5A, an object 50 approaching the side sill S first comes into contact with the vehicle exterior side surface of the side sill outer part S1. At this time, a compressive load (load Lin FIG. 2) acts on the upper wall 11 and lower wall 13 of the side sill outer part S1 illustrated in FIG. 4 in the vehicle width direction (the left-right direction illustrated in FIG. 4).

As illustrated in FIG. 4, the portions corresponding to the upper wall 11 and lower wall 13 of the side sill outer part S1, formed of the metal composite structure 10, transmit the side collision load to the side sill inner part S2 while exhibiting guaranteed high rigidity.

Then, as illustrated in FIG. 5B, the bulkheads 5, provided in the side sill inner part S2 so as to correspond to the floor cross members 8*c*, starts to be crushed and deformed by the transmitted side collision load. The side sill outer part S1 having the reinforcing member S3 inside preferentially causes the side sill inner part S2 to be crushed and deformed together with the bulkhead 5 more than the side sill outer part S1.

Then, as illustrated in FIG. 5C, when the load input from the object 50 further progresses and the side sill outer part S1 starts to be bent and deformed, the reaction force of the side sill outer part S1 increases as the deformation progresses. The increase in the reaction force of the side sill outer part S1 continues until the input load reaches the maximum load capacity of the side sill outer part S1.

With the side sill structure 20 (see FIG. 4) including the metal composite structure 10 (see FIG. 4) as described above, deformation occurs in a side collision in a stepwise manner such that the side sill inner part S2 including the bulkheads 5 is crushed and deformed and then the side sill outer part S1 is deformed. Thus, the side sill structure 20 (see FIG. 4) including the metal composite structure 10 (see FIG. 4) can prevent the side sill outer part S1 from being excessively bent and deformed in an early stage of the side collision.

The side sill structure 20 exhibits a large energy absorbing effect from the early stage to the late stage in a side collision.

In the metal composite structure 10, $h_0$ in Equation (1) is represented by Equation (3), and the thickness $h_3$ of the adhesive layer 3 is equal to or larger than the sheet thickness $h_1$ of the thin steel sheet 1 ($h_1 \leq h_3$).

With the metal composite structure 10, the stresses applied to the joint interfaces of the low-specific-gravity sheet material 2 and the thin steel sheet 1 are reduced by setting the neutral axis Ax in the range of the thickness $h_3$ of the adhesive layer 3. The metal composite structure 10 effectively restrains the low-specific-gravity sheet material 2 from being separated from the thin steel sheet 1.

The thickness $h_3$ of the adhesive layer 3 is preferably less than the sheet thickness $h_2$ of the low-specific-gravity sheet material 2 ($h_2>h_3$). With this condition, the metal composite structure 10 restrains the separation of the low-specific-gravity sheet material 2 from the thin steel sheet 1 further effectively.

In the metal composite structure 10, the thickness $h_3$ of the adhesive layer 3 is preferably greater than the sheet thickness $h_1$ of the thin steel sheet 1 ($h_1<h_3$).

With such a metal composite structure 10, the neutral axis Ax is set in the adhesive layer 3 more reliably by increasing the thickness of the adhesive layer 3.

In the metal composite structure 10, the longitudinal elastic modulus $E_3$ of the adhesive layer 3 is smaller than the longitudinal elastic modulus $E_1$ of the thin steel sheet 1 and is smaller than the longitudinal elastic modulus $E_2$ of the low-specific-gravity sheet material 2.

With such a metal composite structure 10, the neutral axis Ax is set in the adhesive layer 3 further reliably.

In the metal composite structure 10, the low-specific-gravity sheet material 2 may be of a type selected from the group consisting of an aluminum alloy sheet (including duralumin sheet), a magnesium alloy sheet, a CFRP sheet, and a GFRP sheet. With such a metal composite structure 10, the range of selection of the low-specific-gravity sheet material 2 is widened, and thus the range of selection of the bending rigidity D to be set in advance for the metal composite structure 10 is also widened. This also widens the variation of the vehicle body structure to which the metal composite structure 10 is applied.

The metal composite structure 10 may be applied to a vehicle body structural member. With such a metal composite structure 10, it is possible to provide a vehicle body structural member having excellent collision load transmission performance. Specifically, the metal composite structure 10 may be applied to, for example, a side sill structure, a roof side rail structure, a front pillar structure, a center pillar structure, a bumper structure, a door beam structure, and the like. In addition to such vehicle structural members, the metal composite structure 10 may also be applied to moving vehicles such as aircrafts and ships in which both improvement in rigidity and weight reduction are desired.

Although the embodiment of the present invention has been described above, the present invention is not limited to the above-described embodiment, and can be implemented in various forms.

EMBODIMENT EXAMPLE

Next, embodiment examples with which the operation and effect of the metal composite structure 10 of the present embodiment were verified will be described.

Embodiment Example 1

In this embodiment example, assuming the metal composite structure 10 in the side sill structure 20 illustrated in FIG. 4, a cold-rolled high-tensile steel sheet [a 980 material] (unit breadth b: 1, longitudinal elastic modulus $E_1$: 210 GPa, Poisson's ratio $v_1$: 0.3, sheet thickness $h_1$: 1.0 mm) as the thin steel sheet 1 (see FIG. 1) and a CFRP sheet (unit breadth b: 1, longitudinal elastic modulus $E_2$: 70 GPa, Poisson's ratio $v_2$: 0.3, sheet thickness $h_2$: 3.0 mm) as the low-specific-gravity sheet material 2 (see FIG. 1) were provided.

The sheet thickness $h_2$ of the FRP sheet is larger than the sheet thickness $h_1$ of the thin steel sheet 1.

Then, the cold-rolled high-tensile steel sheet and the FRP sheet were bonded to each other with an epoxy-based structural adhesive, thereby producing a metal composite structure 10.

The thickness $h_3$ of the adhesive layer 3 (see FIG. 1) made of a cured product of the epoxy-based structural adhesive was set so as to satisfy the above Equation (1) in order to bring the neutral axis Ax (see FIG. 1) of the metal composite structure 10 closer to the joint interface between the thin steel sheet 1 and the adhesive layer 3 ($h_0=h_3$). The bending rigidity of the metal composite structure 10 assuming the side sill structure 20 was 1180000 $Nm^2$, and the thickness $h_3$ of the adhesive layer 3 was 0.2 mm.

Next, in the present embodiment example, a test piece made of the metal composite structure 10 was produced.

Figure 6:
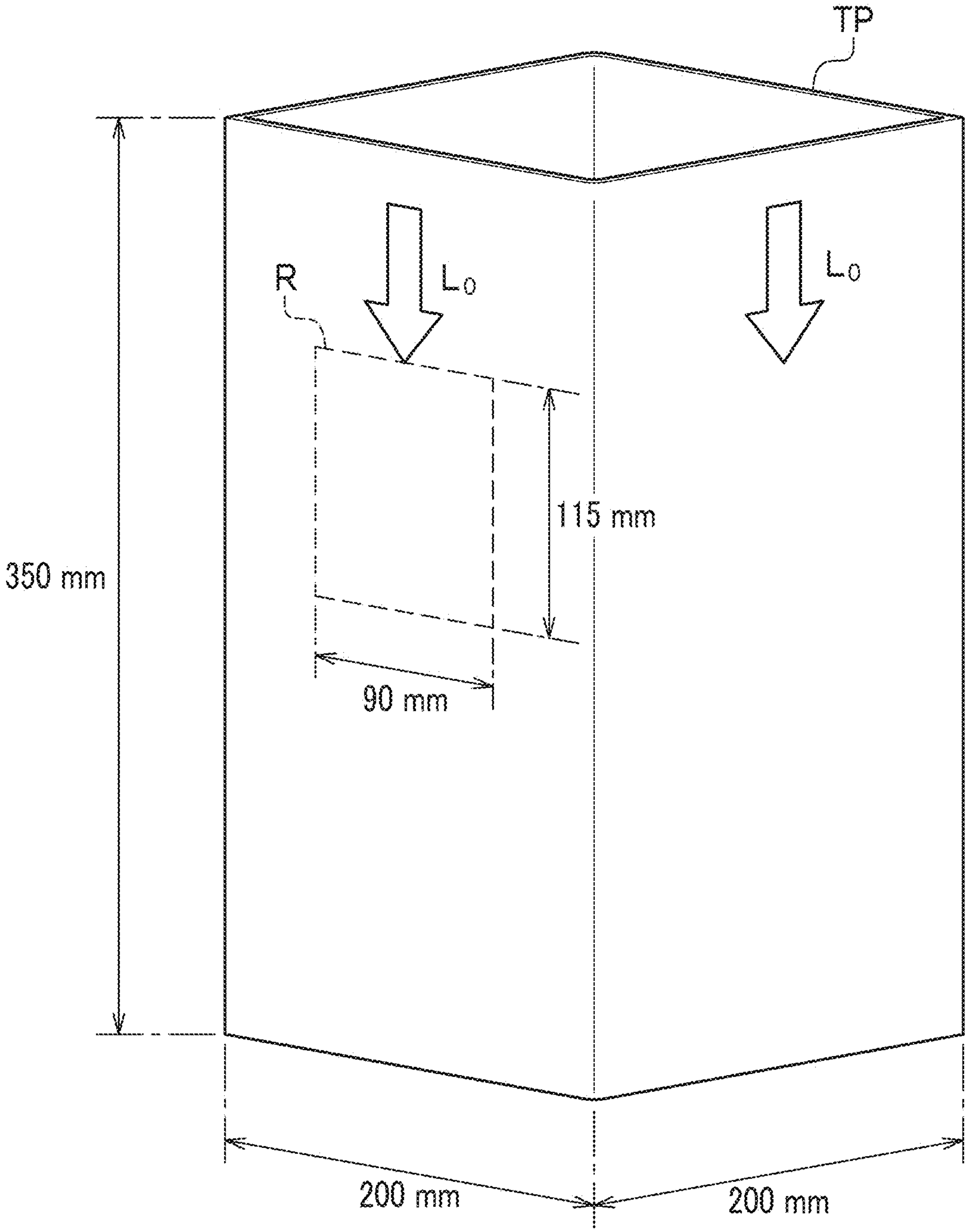
FIG. 6 is a schematic diagram of a test piece of a metal composite structure used in Embodiment Examples of the present invention.

FIG. 6 is a schematic diagram of the test piece TP. As illustrated in FIG. 6, the test piece TP was formed of four metal composite structures 10 having predetermined dimensions and was formed as a square tube having a square cross section with the thin steel sheet on the outer side.

A compression test of the test piece TP of the present embodiment example was conducted in which a load $L_0$ was applied in the axial direction. In the compression test, measurement was performed to measure: displacement in a direction perpendicular to the surface of the test piece TP when the load $L_0$ was applied, in a measurement range R (see FIG. 6) of the thin steel sheet; strain in the axial direction of the CFRP sheet, measured by a strain gauge, when the load $L_0$ was applied; and a maximum load (maximum reaction force) of the test piece TP when the load $L_0$ was applied in the axial direction.

The displacement of the test piece TP in the direction perpendicular to the surface was measured by the digital image correlation (DIC) method. In this compression test for the present embodiment example, it was determined whether the metal composite structure 10 was broken in the FRP sheet (the low-specific-gravity sheet material 2 (see FIG. 1)) or in the adhesive layer 3 (see FIG. 1), based on the displacement in the direction perpendicular to the surface and the strain in the axial direction measured by the strain gauge.

The maximum load (maximum reaction force) of the test piece TP when the load $L_0$ was applied in the axial direction was 506.6 kN. The metal composite structure 10 was broken in the FRP sheet (low-specific-gravity sheet material 2).

Embodiment Example 2

In this example, a test piece TP was produced and the compression test was performed in the same manner as in Embodiment Example 1 except that the thickness $h_3$ of the adhesive layer 3 (see FIG. 1) was set to 5.6 mm so that the neutral axis Ax (see FIG. 1) of the metal composite structures 10 was further close to the joint interface between the thin steel sheet 1 and the adhesive layer 3 ($h_0=h_3$).

As a result, the maximum load (maximum reaction force) of the test piece TP when the load $L_0$ was applied in the axial direction was 966.95 kN. The metal composite structure 10 was broken in the FRP sheet (low-specific-gravity sheet material 2).

Comparative Example 1

For Comparative Example 1, a test piece TP was produced in the same manner as in Embodiment Example 1 except that the sheet thickness $h_2$ of the FRP sheet (low-specific-gravity sheet material 2) was set to 1.0 mm which was the same as the sheet thickness $h_1$ (1.0 mm) of the thin steel sheet 1, and a compression test of the test piece TP was conducted.

As a result, the maximum load (maximum reaction force) of the test piece TP when the load $L_0$ was applied in the axial direction was 186.93 kN. The metal composite structure 10 was broken at the adhesive layer 3.

Comparative Example 2

For Comparative Example 2, a test piece TP was produced only of a cold-rolled high-tensile steel sheet having a sheet thickness of 1.0 mm, which constitutes the metal composite structure 10, and a compression test of the test piece TP was conducted.

As a result, the maximum load (maximum reaction force) of the test piece TP when the load $L_0$ was applied in the axial direction was 74.36 kN.

Evaluation Results

The maximum load (186.93 kN) of the metal composite structure of Comparative Example 1 was about 2.5 times the maximum load (74.36 kN) of the cold-rolled high-tensile steel sheet alone of Comparative Example 2.

In contrast, the maximum load (506.6 kN) of the metal composite structure 10 of Embodiment Example 1 is 6.8 times the maximum load (74.36 kN) of the cold-rolled high-tensile steel sheet alone in Comparative Example 2. The maximum load (966.95 kN) of the metal composite structure 10 in Embodiment Example 2 is 13.0 times the maximum load (74.36 kN) of the cold-rolled high-tensile steel sheet alone in Comparative Example 2.

That is, with the conventional thin steel sheet, the material strength cannot be used up due to insufficient deflection (rigidity) of the sheet, and the sheet is deformed in the out-of-plane direction and buckled. In contrast, with the metal composite structure of the present invention, the FRP material having excellent specific rigidity is bonded to the thin steel sheet via the adhesive layer and the neutral axis is set to the adhesive layer, preferably at the joint interface between the thin steel sheet and the adhesive layer. With this, the metal composite structure of the present invention is capable of making the most of the strength of the thin steel sheet and further improving the "rigidity" of the entire sheet. Further, the metal composite structure is, even while containing the adhesive layer, excellent in the reinforcing effect without being broken with the adhesive being a starting point and contributes to reduction of the weight of the vehicle body required for collision safety.

What is claimed is:

1. A metal composite structure comprising:

a thin steel sheet;

a low-specific-gravity sheet material having a lower specific gravity than the thin steel sheet and a lower strength than the thin steel sheet; and an adhesive layer bonding the thin steel sheet and the low-specific-gravity sheet material and having a lower strength than the thin steel sheet and the low-specific-gravity sheet material, wherein a sheet thickness of the thin steel sheet and a sheet thickness of the low-specific-gravity sheet material are set so as to satisfy the following Equation (1) representing a bending rigidity D of the metal composite structure and Inequality (2), the bending rigidity D being set in advance:

$$D = \frac{bE_1}{3(1-v_1^2)}\{(h_1+h_3-h_0)^3-(h_3-h_0)^3\}+\frac{bE_2}{3(1-v_2^2)}\{(h_2+h_0)^3-h_0^3\} \quad (1)$$

$$h_1 < h_2 \quad (2)$$

wherein in Equation (1), b is a width of the metal composite structure, $E_1$ is a longitudinal elastic modulus of the thin steel sheet, $E_2$ is a longitudinal elastic modulus of the low-specific-gravity sheet material, $v_1$ is a Poisson's ratio of the thin steel sheet, $v_2$ is a Poisson's ratio of the low-specific-gravity sheet material, $h_1$ is the sheet thickness of the thin steel sheet, $h_2$ is the sheet thickness of the low-specific-gravity sheet material, $h_3$ is a thickness of the adhesive layer, and $h_0$ is a distance of a neutral axis of the metal composite structure from a joint interface between the adhesive layer and the low-specific-gravity sheet material, the distance measured from the joint interface between the low-specific-gravity sheet material and the adhesive layer towards the thin steel sheet and satisfying $0 \le h_0 \le h_3$, and wherein in Inequality (2), $h_1$ and $h_2$ have the same meaning as in Equation (1).

2. The metal composite structure according to claim 1, wherein $h_0$ is represented by Equation (3) and the sheet thickness of the thin steel sheet and the thickness of the adhesive layer are set so as to satisfy Inequality (4):

$$h_0 = \frac{E_1h_1(h_1+2h_3)-E_2h_2^2}{2(E_1h_1+E_2h_2)} \quad (3)$$

$$h_1 \le h_3 \quad (4)$$

wherein in Equation (3), $E_1$, $E_2$, $h_0$, $h_1$, $h_2$ and $h_3$ have the same meaning as in Equation (1), and wherein in Inequality (4), $h_1$ and $h_3$ have the same meaning as in Equation (1).

3. The metal composite structure according to claim 1, wherein the neutral axis of the metal composite structure is set within the adhesive layer or at a joint interface between the adhesive layer and the thin steel sheet or at the joint interface between the adhesive layer and the low-specific-gravity sheet material.

4. The metal composite structure according to claim 1, wherein the sheet thickness of the adhesive layer is larger than the thickness of the thin steel sheet.

5. The metal composite structure according to claim 1, wherein the longitudinal elastic modulus of the adhesive layer is smaller than the longitudinal elastic modulus of the thin steel sheet and smaller than the longitudinal elastic modulus of the low-specific-gravity sheet material.

6. The metal composite structure according to claim 1, wherein the low-specific-gravity sheet material is of a type selected from the group consisting of an aluminum alloy sheet, a magnesium alloy sheet, a Carbon Fiber Reinforced Plastics (CFRP) sheet, and a Glass Fiber-Reinforced Plastics (GFRP) sheet.

7. The metal composite structure according to claim 1, wherein the metal composite structure is a vehicle body structural member.

8. A method for producing a metal composite structure according to claim 1, the method comprising steps of:

providing a thin steel sheet and a low-specific-gravity sheet material having a lower specific gravity than the thin steel sheet and having a lower strength than the thin steel sheet; and joining the thin steel sheet and the low-specific-gravity sheet material via an adhesive layer having a lower strength than the thin steel sheet and the low-specific-gravity sheet, wherein the step of joining the thin steel sheet and the low-specific-gravity sheet material is performed such that a neutral axis of the metal composite structure in bending deformation is set within the adhesive layer or at a joint interface between the adhesive layer and the thin steel sheet or at a joint interface between the adhesive layer and the low-specific-gravity sheet material.

* * * * *